US010250891B2

(12) United States Patent
Kazui et al.

(10) Patent No.: US 10,250,891 B2
(45) Date of Patent: Apr. 2, 2019

(54) VIDEO CODING DEVICE, VIDEO CODING METHOD, VIDEO DECODING DEVICE AND VIDEO DECODING METHOD

(71) Applicant: FUJITSU LIMITED, Kawasaki-shi, Kanagawa (JP)

(72) Inventors: Kimihiko Kazui, Kawasaki (JP); Kohji Yamada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 36 days.

(21) Appl. No.: 15/068,847

(22) Filed: Mar. 14, 2016

(65) Prior Publication Data
US 2016/0286222 A1 Sep. 29, 2016

(30) Foreign Application Priority Data

Mar. 26, 2015 (JP) ................. 2015-064986

(51) Int. Cl.
H04N 19/142 (2014.01)
H04N 19/107 (2014.01)
H04N 19/105 (2014.01)
H04N 19/136 (2014.01)
H04N 19/503 (2014.01)
H04N 19/51 (2014.01)
(Continued)

(52) U.S. Cl.
CPC ......... *H04N 19/179* (2014.11); *H04N 19/105* (2014.11); *H04N 19/107* (2014.11); *H04N 19/136* (2014.11); *H04N 19/142* (2014.11); *H04N 19/172* (2014.11); *H04N 19/503* (2014.11); *H04N 19/51* (2014.11); *H04N 19/58* (2014.11); *H04N 19/70* (2014.11); *H04N 19/186* (2014.11); *H04N 19/40* (2014.11)

(58) Field of Classification Search
None
See application file for complete search history.

(56) References Cited

U.S. PATENT DOCUMENTS

2003/0039312 A1* 2/2003 Horowitz ............. H04N 19/159
375/240.24
2007/0286283 A1* 12/2007 Yin ........................ H04N 19/70
375/240.16
(Continued)

FOREIGN PATENT DOCUMENTS

CN 1328747 12/2001
EP 0 705 041 A2 4/1996
(Continued)

OTHER PUBLICATIONS

EPOA—Office Action dated Mar. 31, 2017 for corresponding European Patent Application No. 16158915.5.
(Continued)

Primary Examiner — Kate H Luo
(74) Attorney, Agent, or Firm — Fujitsu Patent Center

(57) ABSTRACT

A storage circuit stores a decoded image of a coded image that is coded before a coding target image included in a video to which the still-image coding and the video coding are applied. A video coding circuit codes the coding target image by inter prediction coding that uses the decoded image as a reference image when the still-image coding is applied to the mage that is one image previous to the coding target image and the video coding is applied to the coding target image.

18 Claims, 12 Drawing Sheets

(51) Int. Cl.
  *H04N 19/179* (2014.01)
  *H04N 19/172* (2014.01)
  *H04N 19/70* (2014.01)
  *H04N 19/58* (2014.01)
  *H04N 19/186* (2014.01)
  *H04N 19/40* (2014.01)

(56) References Cited

U.S. PATENT DOCUMENTS

| | | | |
|---|---|---|---|
| 2009/0141810 A1 | 6/2009 | Tabatabai et al. | |
| 2012/0057636 A1* | 3/2012 | Tian | H04N 7/147 375/240.24 |
| 2013/0022124 A1* | 1/2013 | Sekiguchi | H04N 19/105 375/240.16 |

FOREIGN PATENT DOCUMENTS

| | | |
|---|---|---|
| JP | 07-222173 | 8/1995 |
| JP | 10-65926 | 3/1998 |
| JP | 2003-70002 | 3/2003 |
| JP | 2006-173962 | 6/2006 |
| JP | 2011-055023 | 3/2011 |
| JP | 2011-239240 | 11/2011 |
| WO | 00/19726 | 4/2000 |

OTHER PUBLICATIONS

DVB Organization: "VC9 WD2 dvb.DOC", DVB, Digital Video Broadcasting, C/O EBU—17A Ancienne Route—CH-1218 Grand Saconnex, Geneva—Switzerland, Jan. 11, 2004, XP017803589.

Study Group 16 Chair (on Behalf of SMPTE): "Addendum 1 : Proposed SMPTE Standard for Television: VC-9 Compressed Video Bitstream Format and Decoding Process (Draft Oct. 7, 2003; C24.008-2843B / WD3); TD 62 Add.1", ITU-T Draft Study Period 2001-2004, International Telecommunication Union, Geneva; CH, vol. Study Group 16, Jan. 20, 2004, pp. 1-420, XP017430366.

EESR—The Extended European Search Report dated May 19, 2016 for corresponding European Patent Application No. 16158915.5.

Yoneyama, A., et al, "MPEG Encoding Algorithm with Scene Adaptive Dynamic GOP Structure", Multimedia Signal Processing, 1999 IEEE 3rd Workshop on Copenhagen, Sep. 13, 1999, pp. 297-302, IEEE.

Dai, W., et al., "In Support of a Still Image Profile of HEVC v1", 102. MPEG Meeting; Shanghai; (Motion Picture Expert Group or ISO/IEC JTC1/SC29/WG11), No. m26633, Oct. 8, 2012, pp. 1-3.

ITU-T H.265, Telecommunication Standardization Sector of ITU, Series H: Audiovisual and Multimedia Systems, Infrastructure of audiovisual services—Coding of moving video, "High efficiency video coding", Apr. 2013 (317 pages).

David Flynn et al.; Joint Collaborative Team on Video Coding (JCT-VC) of ITU-T SG16 WP 3 and ISO/IEC JTC 1/SC29/WG 11, "High Efficiency Video Coding (HEVC) Range Extensions text specification: Draft 6", San Jose, US, Jan. 9-17, 2014 (368 pages).

EPOA—European Office Action dated Mar. 27, 2018 for corresponding European Patent Application No. 16158915.5.

CNOA—Chinese Office Action dated Sep. 11, 2018 with full English translation for corresponding Chinese Patent Application No. 201610154130.X.

JPOA—Japanese Office Action dated Oct. 16, 2018 for Japanese Patent Application No. 2015-064986, with full machine English translation.

* cited by examiner

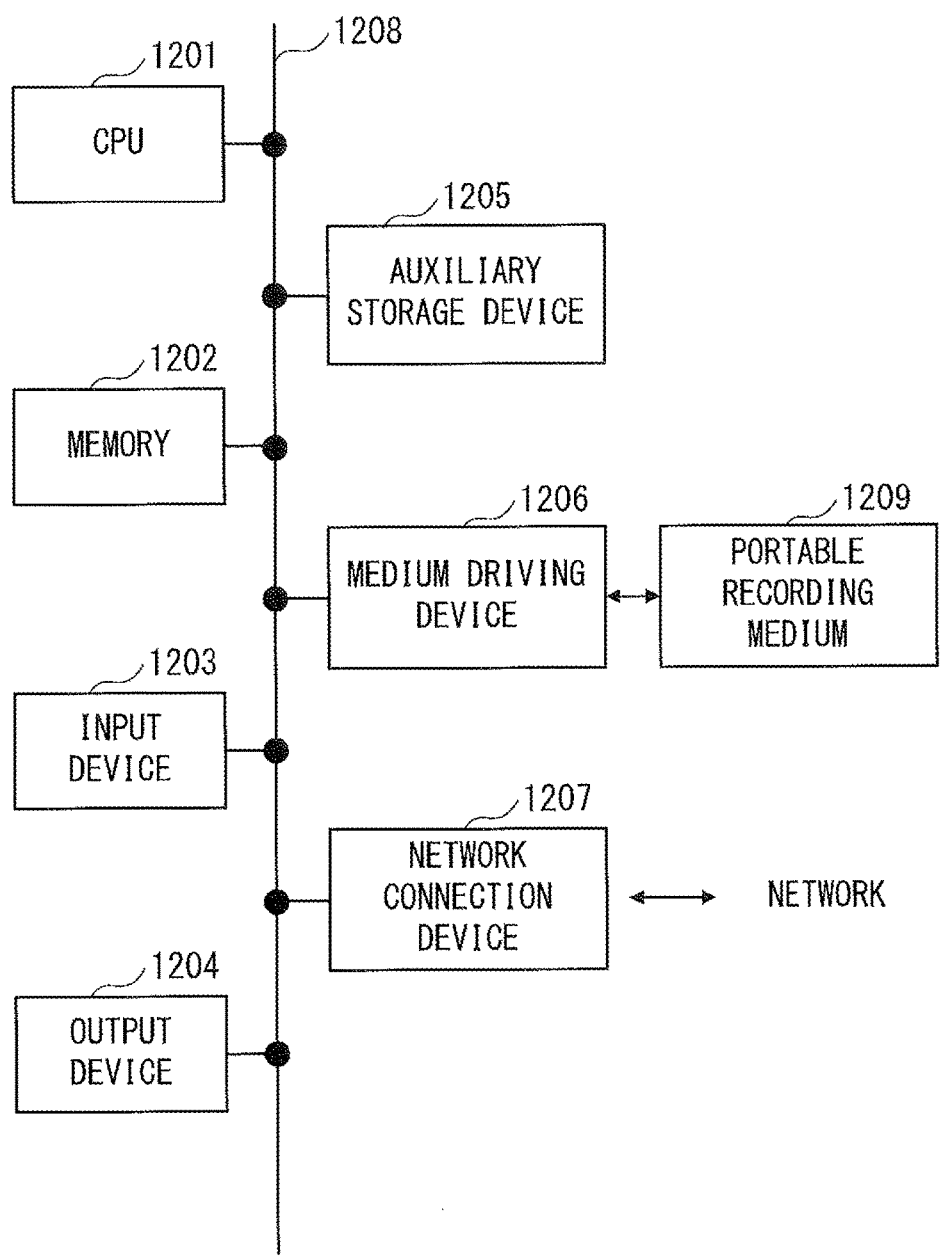
F I G. 12

VIDEO CODING DEVICE, VIDEO CODING METHOD, VIDEO DECODING DEVICE AND VIDEO DECODING METHOD

CROSS-REFERENCE TO RELATED APPLICATION

This application is based upon and claims the benefit of priority of the prior Japanese Patent Application No. 2015-064986, filed on Mar. 26, 2015, the entire contents of which are incorporated herein by reference.

FIELD

The embodiments discussed herein are related to a video coding device, a video coding method, a video decoding device and a video decoding method.

BACKGROUND

In many cases, video data exists using an immense amount of data. Accordingly, when video data is transmitted from a transmission device to a reception device or when video data is stored in a storage unit, that video data receives compression coding.

As representative video coding standards, Moving Picture Experts Group phase 2 (MPEG-2), MPEG-4 and MPEG-4 Advanced Video Coding (MPEG-4 AVC/H.264) are known. These video coding standards are developed by International Organization for Standardization/International Electrotechnical Commission (ISO/IEC).

Also, as a new video coding statndard, High Efficiency Video Coding (HEVC, MPEG-H/H.265) is being developed (see non patent document 1 for example).

The above video coding stardards adopt two coding methods, i.e., the inter prediction coding and the intra prediction coding. The inter prediction coding is a coding method that uses information of a coded image in order to code a coding target image, while the intra prediction coding is a coding method that uses only information included in the coding target image in order to code the coding target image. A coding target image is also referred to as a frame or a picture.

Videos that are the targes of these video coding standards are natural images, obained mainly by using various tyeps of cameras. However, accompanying the progress in the information technology in recent years, a trend has emerged in which video coding is applied to screen content images such as those displayed in a personal computer (PC) desk top etc. in additon to the application of video coding to natural images.

As a specific example of video coding of screen content images, there is a wireless display, which wirelessly transmits images displayed on a PC or a game device to a flat panel display device. As another specific example, there is Virtual Display Infrastructure (VDI), which transmits a user window of a virtual operating system to a mobile device using the Internet protocol.

Screen content images are artificial images generated by using computer graphics etc., and have characteristics different from those of natual images. The first characteristic of screen content image is low correlation of pixels. In natural images, the correlation is high between the pixel value of a target pixel and the pixel value of an adjacent pixel. Discrete Cosine Transform (DCT) adopted by all video coding standards utilizes this high correlation, and can realize high compression efficiency.

By contrast, a screen content iamge has many regions in which the correlation of pixel values is low. Examples of this inlcude the outlines of characters in a text edition window, a one-pixel-level narrow line in a Computer Aided Design (CAD) data edition window, and others. When DCT is applied to these regions, distortions of high-frequency components called mosquito distortions are perceived visually and remarkably particularly under a condition with a low bitrate.

In the first version of the HEVC, which was internationally standardized in 2013, a technique of conducting highly-efficient compression coding on screen content images is introduced partially. A specific example among others is Transform Skip (TS), which skips DCT applied for prediction errors in the intra prediction coding and the inter prediction coding.

Further, in the next version of HEVC, which is being standaized, a technique of increasing further the compression efficiency of screen content iamges is about to be introduced (see non patent document 2 for example).

A photography device that can generate a high-quality still iamge while suppressing an increase in the circut scale is also known (see patent document 1 for example). This photography device compresses a video so as to ouput the compressed video, expands the compressed video so as to output the expaneded video, generates a difference video between the expanded video and a video corresponding to the expanded video, compresses the difference video so as to output the compressed difference video. Thereafter, the photography device expands the compressed difference video so as to output the expanded difference video, adds the expanded video and the expanded difference video so as to generate an added video, and generates a still image by using the added video.

Patent document 1: Japanese Laid-open Patent Publication No. 2011-239240

Non patent document 1: ITU-T H.265ISO/IEC 23008-2, "High efficiency video coding", 2013

Non patent document 2: D. Flynn et al., "High Efficiency Video Coding (HEVC) Range Extensions text specification: Draft 6", JCTVC-P1005, 16th JCT-VC Meeting, San José, US, 9-17 Jan. 2014

SUMMARY

According to one idea, a video coding device inlcudes a storage circuit and a video coding circuit.

A storage circuit stores a decoded image of a coded image that is coded before a coding target image included in a video to which the still-image coding and the video coding are applied. A video coding circuit codes the coding target image by the inter prediction coding that uses the decoded image as a reference image when the still-image coding is applied to the image that is one image previous to the coding target image and the video coding is applied to the coding target image.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 illustrates a configuration of an information processing apparatus.

DESCRIPTION OF EMBODIMENTS

Figure 1:
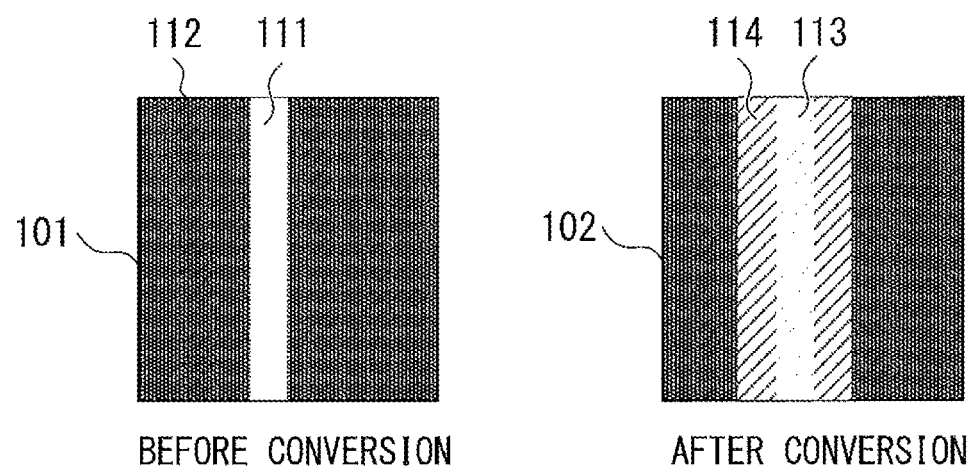
FIG. 1 illustrates deterioration in an image.

Hereinafter, the embodiments will be explained in detail by referring to the drawings.

In the coding of a screen content image, not only the coding system but also the filtering of pixel values before the coding matters.

In video coding standards such as MPEG etc., pixel values are often coded in the format of YCbCr 4:2:0, while screen content images are often captured in the format of RGB 4:4:4. When a video coding is applied to a screen content image of the format of RGB 4:4:4, the image of the format of RGB 4:4:4 is converted into an image of the format of YCbCr 4:4:4. By thereafter applying a down sampling filter to the image of the format in YCbCr 4:4:4, an image of the format of YCbCr 4:2:0 is generated.

In the image of the format of YCbCr 4:2:0, two color difference components Cb and Cr are down sampled to ½ in the vertical and horizontal directions, compared with an image of the format of YCbCr 4:4:4. The purpose of using the format of YCbCr 4:2:0 in video coding is the reduction of the information amount in the coding.

Human eyes have lower perception characteristics of spatial direction resolutions for color difference components Cb and Cr than those for brightness component Y, whereas natural images have almost no color difference components of high spatial frequency, which are lost through down sampling. Accordingly, the difference between the format of YCbCr 4:4:4 and the format of YCbCr 4:2:0 is rarely perceived.

By contrast, in screen content images, the difference between the format of YCbCr 4:4:4 and the format of YCbCr 4:2:0 is clearly perceived. For example, a one-pixel-level narrow line such as wirings in a CAD image includes a color difference component of a high spatial frequency, which leads to a situation where the deterioration in such narrow lines is noticeable remarkably in a flat background very often used for screen content images.

FIG. 1 illustrates an example of deterioration in an image caused by down sampling. In an image 101 of the format of YCbCr 4:4:4 before conversion, the pixel value (Y,Cb,Cr) of a vertical line 111 around the middle portion is (128,0,0), while the pixel value of regions 112 that are regions other than the vertical line 111 is (0,128,128).

When a 2:1 down-sampling filter is applied to color difference components Cb and Cr in the horizontal direction (and vertical direction) so as to convert the image into the format of 4:2:0 and a 1:2 up-sampling filter is applied so as to restore the image to the original format of 4:4:4, an image 102 is obtained. In the image 102, the pixel value of a vertical line 113 has been changed to (124,64,64), and the pixel value of regions 114 adjacent to the vertical line 113 has been changed to (0,96,96).

As described above, by applying a down-sampling filter and an up-sampling filter, color difference components in the vertical line and regions adjacent to the vertical line change. This change in pixel values is perceived clearly by human eyes when a uniform background is used.

In order to prevent the deterioration in a one-pixel-level narrow line, it is desirable that the format of YCbCr 4:4:4 or the format of RGB 4:4:4 be applied in video coding. However, such application leads to a greater number of pixels of color difference components to be coded than that in the case of the format of 4:2:0 and increase of information amount after coding.

In view of this, still-video mixed coding is possible in which still-image coding that conducts conding in the format of YCbCr 4:4:4 and video coding that conducts coding in the format of YCbCr 4:2:0 or the format of YCbCr 4:2:2 are both employed. For still-image coding, Joint Photographic Experts Group (JPEG) system for example is used, while an MPEG system for example is used for video coding.

According to still-video mixed coding, the coding mode is dynamically switched on the basis of whether an image corresponding to the entirety or part in the screen is still or moving. When the image is still, specifically when the difference between two consecutive frames is zero, the video coding device applies the still-image coding to the first frame after the image becomes still and does not code the subsequent frames. After decoding frames that received the still-image coding, the video decoding device repeatedly displays the same decoded image until it receives the next coded data. When the image is moving, the video coding device applies the video coding to the frames.

Human eyes have lower perception characteristics for image deterioration in regions involving movements than for those in still regions. This makes it possible to reduce the amount of occurring information while minimizing image deterioration that are perceived by humans.

Note that in natural images, noise occurs due to a plurality of factors when such images are obtained and therefore the pixel values are variable slightly even when the images are still, and accordingly no difference between any frames is zero. By contrast, in screen content images, such noise does not occur, and differences between frames are zero when the image is still.

Figure 2:
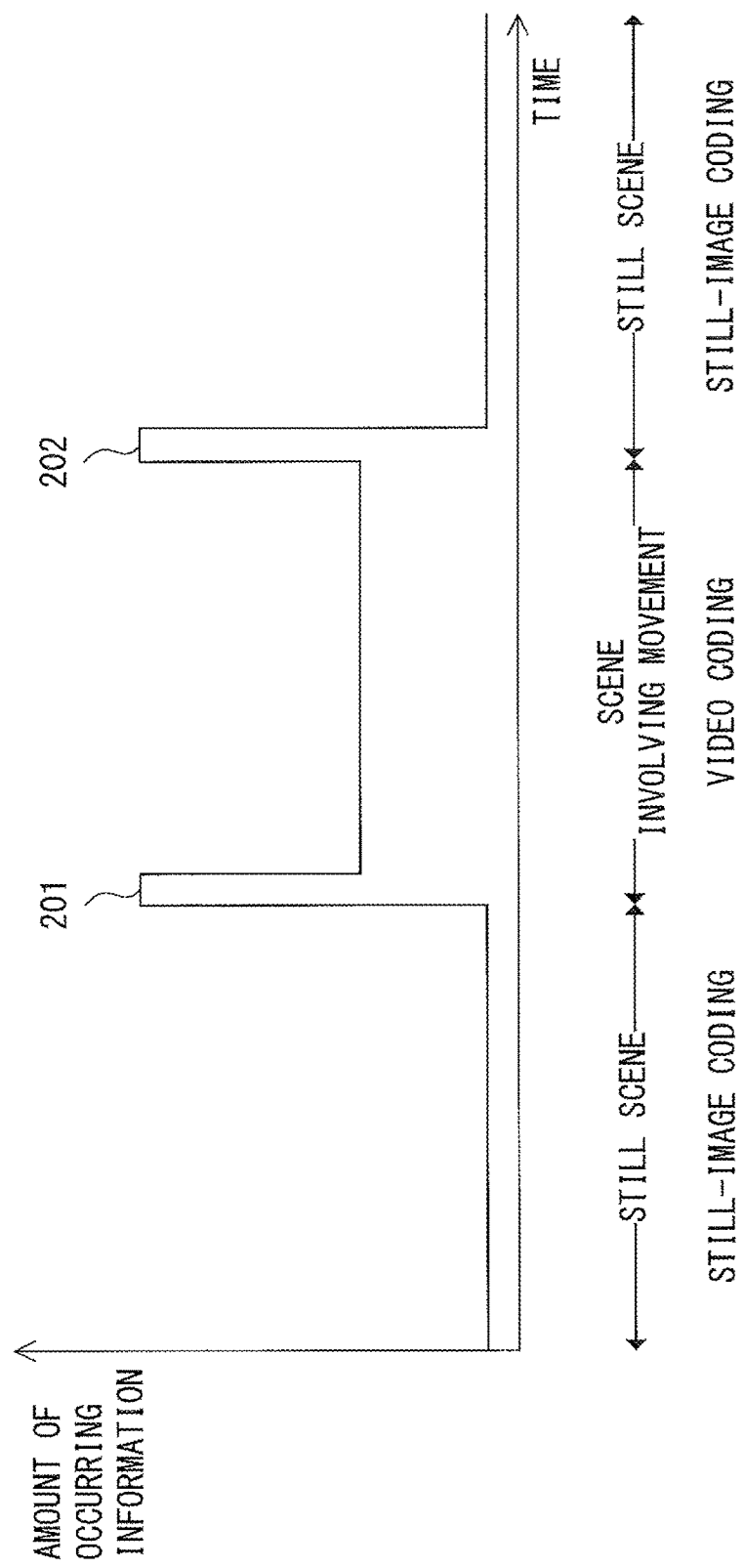
FIG. 2 illustrates an example of changes in the amount of occurring information.

FIG. 2 illustrates an example of changes in the amount of the information occurring in the above still-video mixed coding. In the still-video mixed coding, the still-image coded data and the video coded data are each closed in itself.

When for example a still scene transitions to a scene involving movements, the video coding device first applies the still-image coding to frames, and switches from the still-image coding to the video coding. In video coding such as MPEG etc., the video coding device uses the intra prediction coding to code the first frame immediately after the switching to the video coding, and codes subsequent frames by using the inter prediction coding.

In the intra prediction coding, much information occurs, leading to a possibility that information occurs explosively when the coding mode is switched from the still-image coding to the video coding as depicted by a peak 201 causing congestion in the communication network.

When a scene involving movements transitions to a still scene, the video coding device switches the coding mode from the inter prediction coding to the still-image coding.

In still-image coding such as JPEG etc., more information is caused by the still-image coding than that caused by the inter prediction coding as depicted by a peak 202.

In order to suppress the occurrence of excessive information due to the switching from the still-image coding to the video coding, a method is possible in which the difference is obtained between the decoded frame of a coded frame that received the still-image coding and the first frame after the switching so as to code this difference by the intra prediction coding. However, this method can reduce the amount of information after the coding of the first frame, while it fails to reduce the amount of information of the subsequent frames.

The reason is that the difference between a frame coded in the past and the coding target frame is coded in the inter prediction coding for the subsequent frames. When the decoded frame of the first frame after the switching is not a normal frame but the difference between the two frames, the difference from a normal frame that is the next coding target frame becomes too large, enormously reducing the efficiency of the inter prediction.

Note that this problem arises not only in coding a video including a screen content image but also in coding a video including other types of images in which image deterioration is noticeable remarkably.

In view of the above, a method is possible in which the decoded frame of a coded frame that received the still-image coding is treated as a frame coded before the first frame after the switching, and the inter prediction coding is applied to the first frame after the switching by using that frame as a reference frame. In this method, the first frame after the switching is coded by the inter prediction coding, the amount of occurring information of coding is smaller than that in the intra prediction coding because the first frame after the switching is coded by the inter prediction coding.

Figure 3:
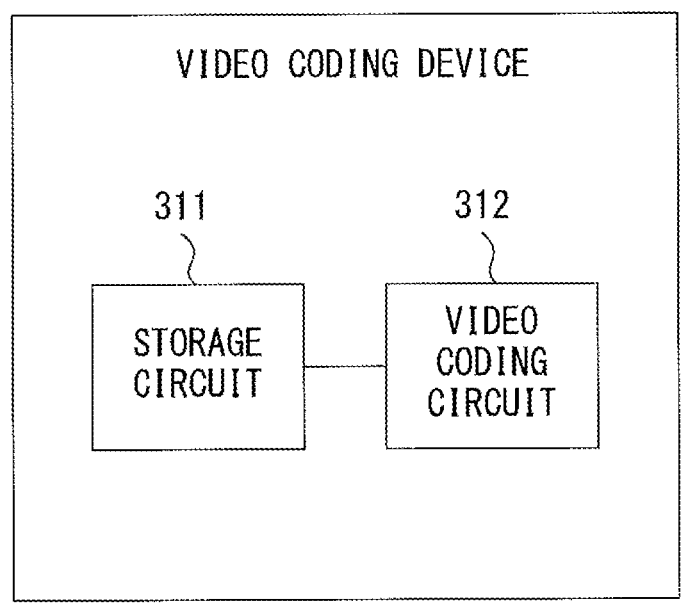
FIG. 3 illustrates a configuration of a video coding device.

FIG. 3 illustrates a configuration example of a video coding device according to the embodiment. A video coding device 301 illustrated in FIG. 3 includes a storage circuit 311 and a video coding circuit 312. The storage circuit 311 stores a decoded image of an image that is coded before the coding target image included in a video to which the still-image coding and the video coding are applied. When the still-image coding is applied to the image that is one image previous to the coding target image and the video coding is applied to the coding target image, the video coding circuit 312 codes the coding target image by using the inter prediction coding that uses the decoded image as a reference image.

Figure 4:
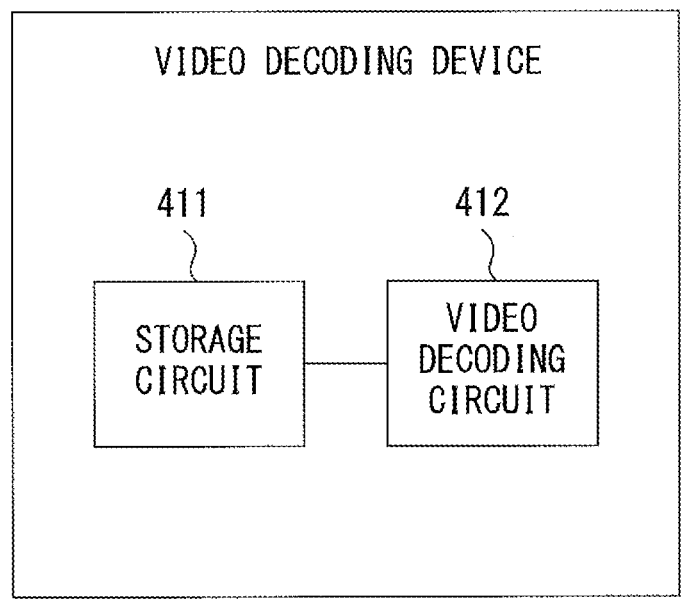
FIG. 4 illustrates a configuration of a video decoding device.

FIG. 4 illustrates a configuration example of a video decoding device according to the embodiment. A video decoding device 401 illustrated in FIG. 4 includes a storage circuit 411 and a video decoding circuit 412. The storage circuit 411 stores a decoded image that is decoded before the decoding target image included in a coded video to which the still-image decoding and the video decoding are applied. When the still-image decoding is applied to the coded image that is one image previous to the decoding target image and the video decoding is applied to the decoding target image, the video decoding circuit 412 decodes the decoding target image by using the inter prediction decoding that uses the decoded image as a reference image.

According to the video coding device 301 illustrated in FIG. 3 or the video decoding device 401 illustrated in FIG. 4, it is possible to suppress an increase in the amount of information caused by the switching from the still-image coding to the video coding in a coding system that uses both the still-image coding and the video coding.

The video coding device 301 and the video decoding device 401 are used for various purposes. For example, the video coding device 301 or the video decoding device 401 can be installed in a video camera, a video transmission device, a video reception device, a videophone system, a computer or a mobile phone device.

Figure 5:
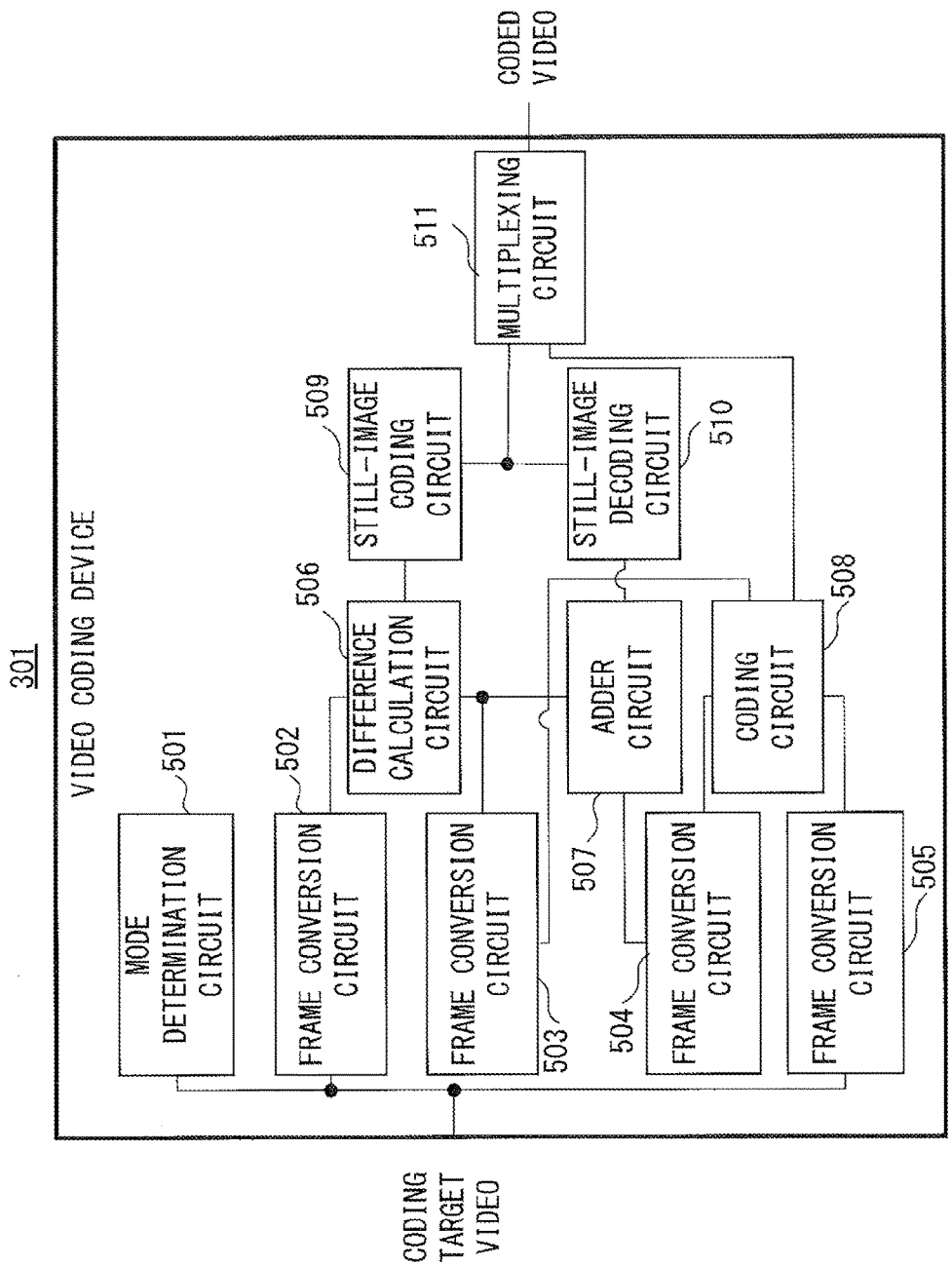
FIG. 5 illustrates a specific example of a video coding device.

FIG. 5 illustrates a specific example of the video coding device 301 illustrated in FIG. 3. The video coding device 301 illustrated in FIG. 3 includes a mode determination circuit 501, frame conversion circuits 502 through 505, a difference calculation circuit 506, an adder circuit 507, a coding circuit 508, a still-image coding circuit 509, a still-image decoding circuit 510 and a multiplexing circuit 511.

The video coding device 301 can be implemented as for example a hardware circuit. In such a case, the video coding device 301 may include respective constituents as individual circuits or may be one integrated circuit.

The video coding device 301 codes a coding target video that is input, and outputs the coded video. A coding target video includes a plurality of frames. Each frame corresponds to the coding target image (coding target frame) and may be a color image or may be a monochrome image. When a frame is a color image, the pixel values may be RGB signals or may be color difference signals. Hereinafter, explanations will be given for a case where pixel values are color difference signals.

The mode determination circuit 501 includes a frame buffer, and calculates the difference between the pixel value of a coding target frame and the pixel value of the previous frame, which is one image previous to the coding target frame. Then, the mode determination circuit 501 determines whether or not the coding target frame is still, on the basis of the difference between the two frames.

When the coding target frame involves movements, the mode determination circuit 501 selects the video coding as the coding mode, and selects the still-image coding as the coding mode when the coding target frame is still. Then, the mode determination circuit 501 outputs to each circuit in the video coding device 301 a control signal representing the selected coding mode.

The frame conversion circuit 502 convers the color difference format of the coding target frame into the color difference format of the still-image coding, and outputs the converted frame to the difference calculation circuit 506. The frame conversion circuit 503 convers the color difference format of a decoded frame output from the coding circuit 508 (the color difference format of the video coding) into the color difference format of the still-image coding, an outputs the converted decoded frame to the difference calculation circuit 506 and the adder circuit 507.

The color difference format of a coding target frame may be the format of YCbCr 4:4:4, the color difference format of the still-image coding may be the format of YCbCr 4:2:2, and the color difference format of the video coding may be the format of YCbCr 4:2:0.

When the coding mode of the previous frame is the video coding, the difference calculation circuit 506 calculates the difference between the pixel value of a frame output from the frame conversion circuit 502 and the pixel value of a frame output from the frame conversion circuit 503. Then, the difference calculation circuit 506 outputs the difference between the two frames to the still-image coding circuit 509. When the coding mode of the previous frame is the still-image coding, the difference calculation circuit 506 outputs, to the still-image coding circuit 509, a frame output from the frame conversion circuit 502 as it is.

The still-image coding circuit 509 conducts the still-image coding on the difference or the frame output from the difference calculation circuit 506 so as to generate a still-image coded frame, and outputs the frame to the still-image decoding circuit 510 and the multiplexing circuit 511. The still-image decoding circuit 510 decodes the still-image coded frame output from the still-image coding circuit 509, and outputs the difference between the two frames or the decoded frame to the adder circuit 507.

When the difference is output from the still-image decoding circuit 510, the adder circuit 507 adds the difference to the decoded frame output from the frame conversion circuit 503, and outputs the decoded frame that is the addition result to the frame conversion circuit 504. When a decoded frame is output from the still-image decoding circuit 510, the adder circuit 507 outputs to the frame conversion circuit 504 that decoded frame as it is.

The frame conversion circuit 504 converts the color difference format of a decoded frame output from the adder circuit 507 into the color difference format of the video coding, and outputs the converted decoded frame to the coding circuit 508. The frame conversion circuit 505 converts the color difference format of the coding target frame into the color difference format of the video coding, and outputs the converted frame to the coding circuit 508.

The coding circuit 508 uses the decoded frame output from the frame conversion circuit 504 so as to conduct the video coding to code the frame output from the frame conversion circuit 505, and generates a video coded frame so as to output it to the multiplexing circuit 511. Also, the coding circuit 508 locally decodes the generated video coded frame so as to generate a decoded frame, and outputs it to the frame conversion circuit 503.

The multiplexing circuit 511 multiplexes still-image coded frames output from the still-image coding circuit 509 and video coded frames output from the coding circuit 508 so as to output the resultant frames as a coded video. To the coded video, information of the coding mode of each coded frame, information of the color difference format in each coding mode, etc. are added. The video coding device 301 may transmit the coded video to the video decoding device 401 via a communication network.

Figure 6:
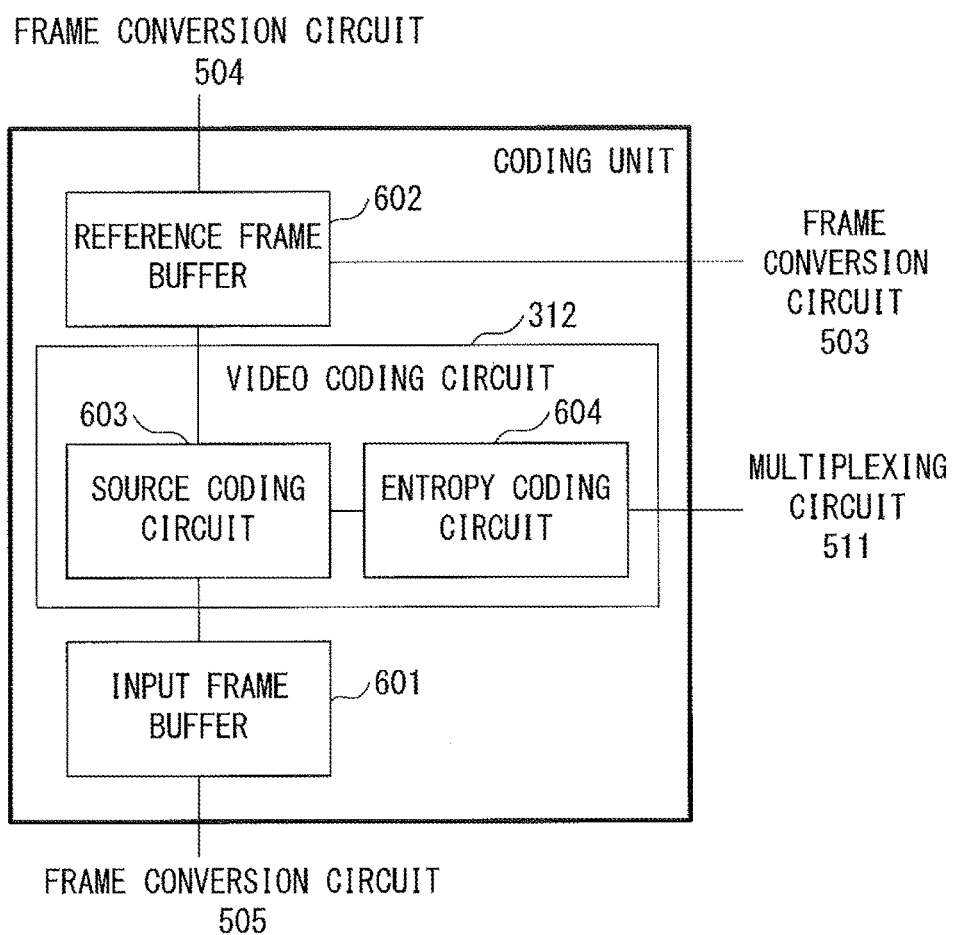
FIG. 6 illustrates a configuration of a coding circuit.

FIG. 6 illustrates a configuration example of the coding circuit 508 illustrated in FIG. 5. The coding circuit 508 illustrated in FIG. 6 includes the video coding circuit 312, an input frame buffer 601 and a reference frame buffer 602. The input frame buffer 601 and the reference frame buffer 602 correspond to the storage circuit 311. The video coding circuit 312 includes a source coding circuit 603 and an entropy coding circuit 604.

The input frame buffer 601 stores, as a process target frame, a frame output from the frame conversion circuit 505, and outputs the frame to the source coding circuit 603. The reference frame buffer 602 stores, as a reference frame, a decoded frame output from the frame conversion circuit 504. This reference frame is output to the source coding circuit 603 when the inter prediction coding is applied to the first frame after the switching from the still-image coding to the video coding.

The source coding circuit 603 applies the source coding to a process target frame stored in the input frame buffer 601, and outputs the coding result to the entropy coding circuit 604. The source coding corresponds to the inter prediction coding or the intra prediction coding, and includes the inter prediction or the intra prediction, the frequency conversion and quantization of a prediction error, the addition of the conversion result of the inverse quantization and inverse frequency conversion with a predicted pixel value, and the filtering that uses an intra-loop filter.

In the inter prediction coding, the source coding circuit 603 calculates a prediction error on the basis of the pixel value of a process target frame stored in the input frame buffer 601 and the pixel value of a reference frame stored in the reference frame buffer 602. Then, the source coding circuit 603 quantizes a result of frequency converting the prediction error so as to output the quantization result to the entropy coding circuit 604. Also, the source coding circuit 603 generates a decoded frame by locally decoding the quantization result and stores the generated decoded frame in the reference frame buffer 602 as a reference frame.

The entropy coding circuit 604 conducts the entropy coding to code, together with a prediction coding parameter etc., the quantization result output from the source coding circuit 603 so as to generate a video coded frame, and outputs the video coded frame to the multiplexing circuit 511. A prediction coding parameter includes for example information of a quantization step, a motion vector, etc.

Figure 7:
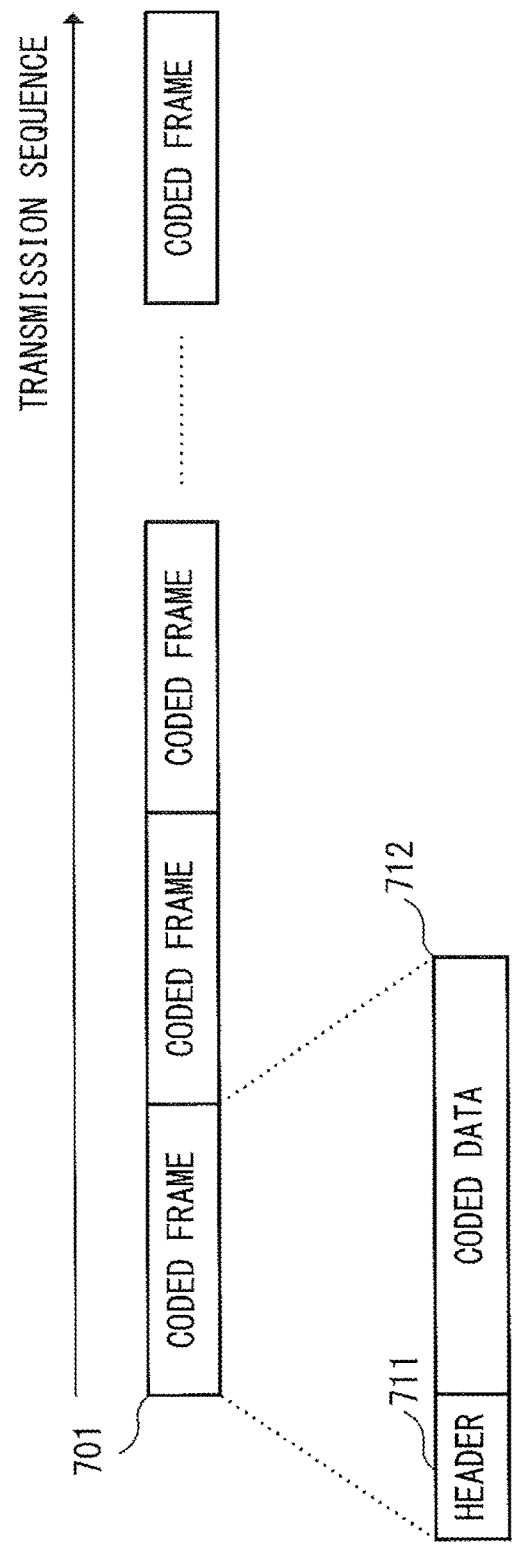
FIG. 7 illustrates a coded video.

FIG. 7 illustrates an example of a coded video output from the multiplexing circuit 511. The coded video illustrated in FIG. 7 includes a plurality of coded frames 701 that are output in accordance with the transmission sequence. Each coded frame 701 is a still-image coded frame or a video coded frame and includes a header 711 and coded data 712.

The header 711 includes information representing the coding mode of the coded frame 701, the color difference format of a coding target frame and the color difference format of the coded frame 701. The coded data 712 corresponds to the result of coding of the coding target frame.

Figure 8:
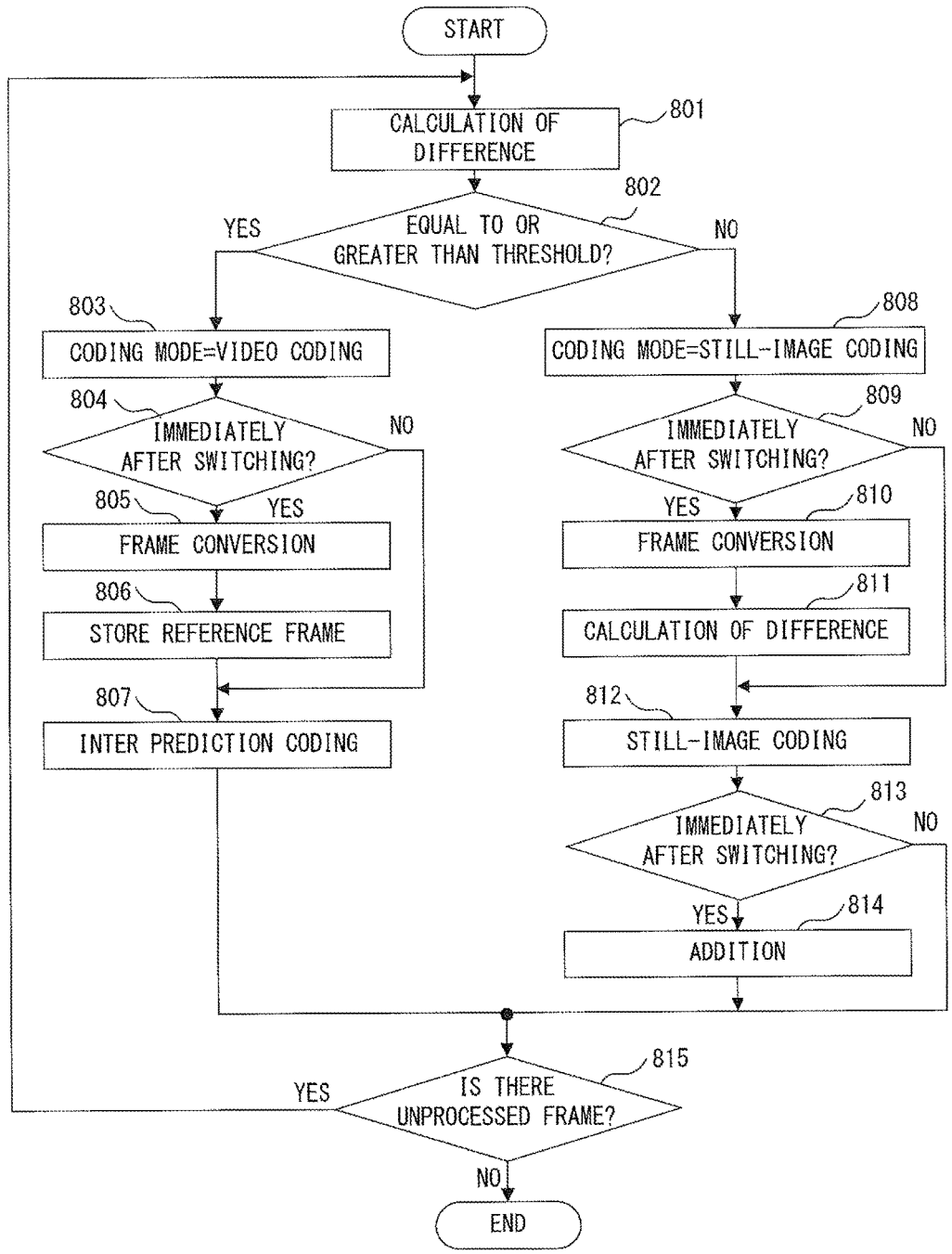
FIG. 8 is a flowchart for a still-video mixed coding process.

FIG. 8 is a flowchart explaining an example of still-video mixed coding process conducted by the video coding device 301. First, the mode determination circuit 501 calculates the difference between a coding target frame and the previous frame (step 801) and compares the difference and a threshold (step 802).

When the difference is equal to or greater than the threshold (Yes in step 802), the mode determination circuit 501 selects the video coding as the coding mode (step 803) while the frame conversion circuit 505 converts the color difference format of the coding target frame into the color difference format of the video coding.

Next, the frame conversion circuit 504 checks whether or not it is immediately after the switching of the coding mode to the video coding (step 804). When the coding mode of the previous frame is the still-image coding, it is determined to be immediately after the switching, and when the coding mode of the previous frame is the video coding, it is determined to be not immediately after the switching.

When it is immediately after the switching to the video coding (Yes in step 804), the frame conversion circuit 504 converts the color difference format of the decoded frame of the previous frame that received the still-image coding into the color difference format of the video coding (step 805). Then, the coding circuit 508 stores the converted decoded frame in the reference frame list in the reference frame buffer 602 (step 806).

Next, the coding circuit 508 uses the converted decoded frame as a reference frame so as to code the coding target frame by using the inter prediction coding in order to generate a video coding frame (step 807). Then, the coding circuit 508 generates a decoded frame of the video coded frame and adds the decoded frame to the reference frame list in the reference frame buffer 602. The frame conversion circuit 503 converts the color difference format of that decoded frame into the color difference format of the still-image coding.

As described above, by using the inter prediction coding to code the first coding target frame after the switching from the still-image coding to the video coding, it is possible to suppress an excessive increase in the coding amount caused by the switching compared with a case of the intra prediction coding.

When it is not immediately after the switching to the video coding, (No in step 804), the coding circuit 508 uses one of the reference frames in the reference frame list and codes a coding target frame by using the inter prediction coding (step 807).

Next, the mode determination circuit 501 checks whether or not a frame remains unprocessed (step 815), and when there is a frame remaining unprocessed (Yes in step 815), the processes in and subsequent to step 801 are repeated treating the next frame as a coding target frame.

When the difference is smaller than the threshold (No in step 802), the mode determination circuit 501 selects the still-image coding as the coding mode (step 808) while the frame conversion circuit 502 converts the color difference format of the coding target frame into the color difference format of the still-image coding.

Next, the frame conversion circuit 503 checks whether or not it is immediately after the switching of the coding mode to the still-image coding (step 809). When the coding mode of the previous frame is the video coding, it is determined to be immediately after the switching, and when the coding mode of the previous frame is the still-image coding, it is determined to be not immediately after the switching.

When it is immediately after the switching to the still-image coding (Yes in step 809), the frame conversion circuit 503 converts the color difference format of the decoded frame of the previous frame that received the video coding into the color difference format of the still-image coding (step 810). Then, the difference calculation circuit 506 calculates the difference between the converted coding target frame and the converted decoded frame (step 811).

Next, the still-image coding circuit 509 codes the difference by the still-image coding so as to generate a still-image coded frame (step 812). Thereafter, the still-image decoding circuit 510 generates the difference by decoding the still-image coded frame.

As described above, the first coding target frame after the switching from the video coding to the still-image coding is coded by using the difference from the decoded frame of the previous frame that received the video coding. Thereby, it is possible to suppress an excessive increase in the coding amount caused by the switching compared with a case of the still-image coding such as JPEG etc.

When it is not immediately after the switching to the still-image coding (No in step 809), the still-image coding circuit 509 uses the still-image coding to code the converted coding target frame so as to generate a still-image coded frame (step 812). Then, the still-image decoding circuit 510 generates a decoded frame by decoding the still-image coded frame.

Next, the adder circuit 507 checks whether or not it is immediately after the switching of the coding mode to the still-image coding (step 813). When it is immediately after the switching to the video coding (Yes in step 813), the adder circuit 507 adds the difference generated by the still-image decoding circuit 510 to the converted decoded frame so as to generate a decoded frame as the addition result (step 814).

When it is not immediately after the switching to the still-image coding (No in step 813), the adder circuit 507 outputs as it is the decoded frame generated by the still-image decoding circuit 510.

Next, the mode determination circuit 501 performs the processes in and subsequent to step 815. When all frames have been coded (No in step 815), the mode determination circuit 501 terminates the process.

Figure 9:
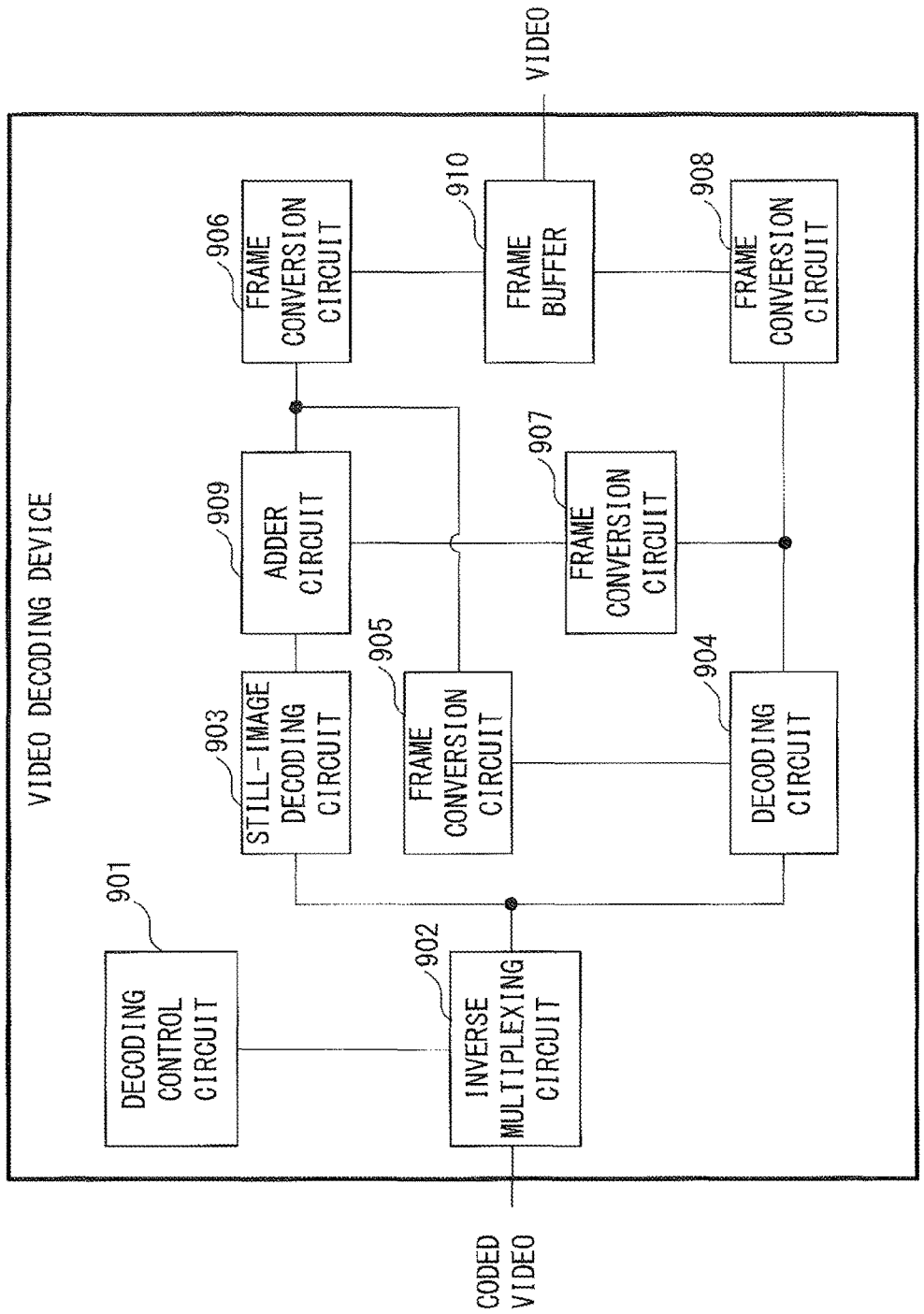
FIG. 9 illustrates a specific example of a video decoding device.

FIG. 9 illustrates a specific example of the video decoding device 401 illustrated in FIG. 4. The video decoding device 401 illustrated in FIG. 9 includes a decoding control circuit 901, an inverse multiplexing circuit 902, a still-image decoding circuit 903, a decoding circuit 904, frame conversion circuits 905 through 908, an adder circuit 909 and a frame buffer 910.

The video decoding device 401 can be implemented as for example a hardware circuit. In such a case, the video decoding device 401 may include respective constituents as individual circuits or may be one integrated circuit.

The video decoding device 401 decodes a coded video that is input, and outputs a video that is the decoding result. The coded video includes a plurality of coded frames, and each coded frame corresponds to a decoding target image (decoding target frame).

The inverse multiplexing circuit 902 inversely multiplexes the coded video so as to extract a still-image coded frame, a video coded frame, information of the coding mode of each coded frame, information of the color difference format in each coding mode. Then, the inverse multiplexing circuit 902 outputs the still-image coded frame to the still-image decoding circuit 903, outputs the video codded frame to the decoding circuit 904, and outputs the information of the coding mode and the information of the color difference format to the decoding control circuit 901.

The decoding control circuit 901 obtains the coding mode of a decoding target frame, the color difference format of the still-image coding and the color difference format of the video coding from the information of the coding mode and the information of the color difference format output from the inverse multiplexing circuit 902. Then, the decoding control circuit 901 outputs, to each circuit in the video decoding device 401, a control signal specifying the coding mode and the color difference format.

The still-image decoding circuit 903 generates a decoding result by using the still-image decoding to code a still-image coded frame output from the inverse multiplexing circuit 902, and outputs the decoding result to the adder circuit 909. When the coding mode of the previous frame, which is one image previous to the decoding target frame, is the video coding, the decoding result represents the difference between the two frames, and when the coding mode of the previous frame is the still-image coding, the decoding result represents a still-image decoded frame.

When the coding mode of the previous frame is the video coding, the adder circuit 909 adds the difference output from the still-image decoding circuit 903 and the converted decoded frame output from the frame conversion circuit 907 so as to generate a decoded frame as the addition result. Then, the adder circuit 909 outputs the decoded frame as the addition result to the frame conversion circuit 905 and the frame conversion circuit 906. When the coding mode of the previous frame is the still-image coding, the adder circuit 909 outputs the still-image decoded frame output from the still-image decoding circuit 903 as it is to the frame conversion circuit 906.

The frame conversion circuit 906 converts the color difference format of the decoded frame as the addition result or the still-image decoded frame output from the adder circuit 909 (color difference format of the still-image coding) into the color difference format of the video output from the video decoding device 401. Then, the frame conversion circuit 906 outputs the converted decoded frame to the frame buffer 910. The frame conversion circuit 905 converts the color difference format of the decoded frame as the addition result output from the adder circuit 909 into the color difference format of the video coding, and outputs the converted decoded frame to the decoding circuit 904.

The color difference format of the still-image coding maybe the format of YCbCr 4:2:2 and the color difference format of the video coding may be the format of YCbCr 4:2:0, while the color difference format of a video output from the video decoding device 401 may be the format of YCbCr 4:4:4.

The decoding circuit 904 uses the converted decoded frame output from the frame conversion circuit 905 so as to decode, by using the video decoding, a video coded frame output from the inverse multiplexing circuit 902, and generates a video decoded frame. Then, the decoding circuit 904 outputs the video decoded frame to the frame conversion circuit 907 and the frame conversion circuit 908.

The frame conversion circuit 908 converts the color difference format of the video decoded frame output from the decoding circuit 904 (color difference format of the video coding) into the color difference format of the video output from the video decoding device 401, and outputs the converted decoded frame to the frame buffer 910. The frame conversion circuit 907 converts the color difference format of the video decoded frame output from the decoding circuit 904 into the color difference format of the still-image coding, and outputs the converted decoded frame to the adder circuit 909.

The frame buffer 910 buffers the converted decoded frames output from the frame conversion circuit 906 and the frame conversion circuit 908, and outputs the frames to the display device in accordance with the display timings. Thereby, the video is displayed on the screen.

Figure 10:
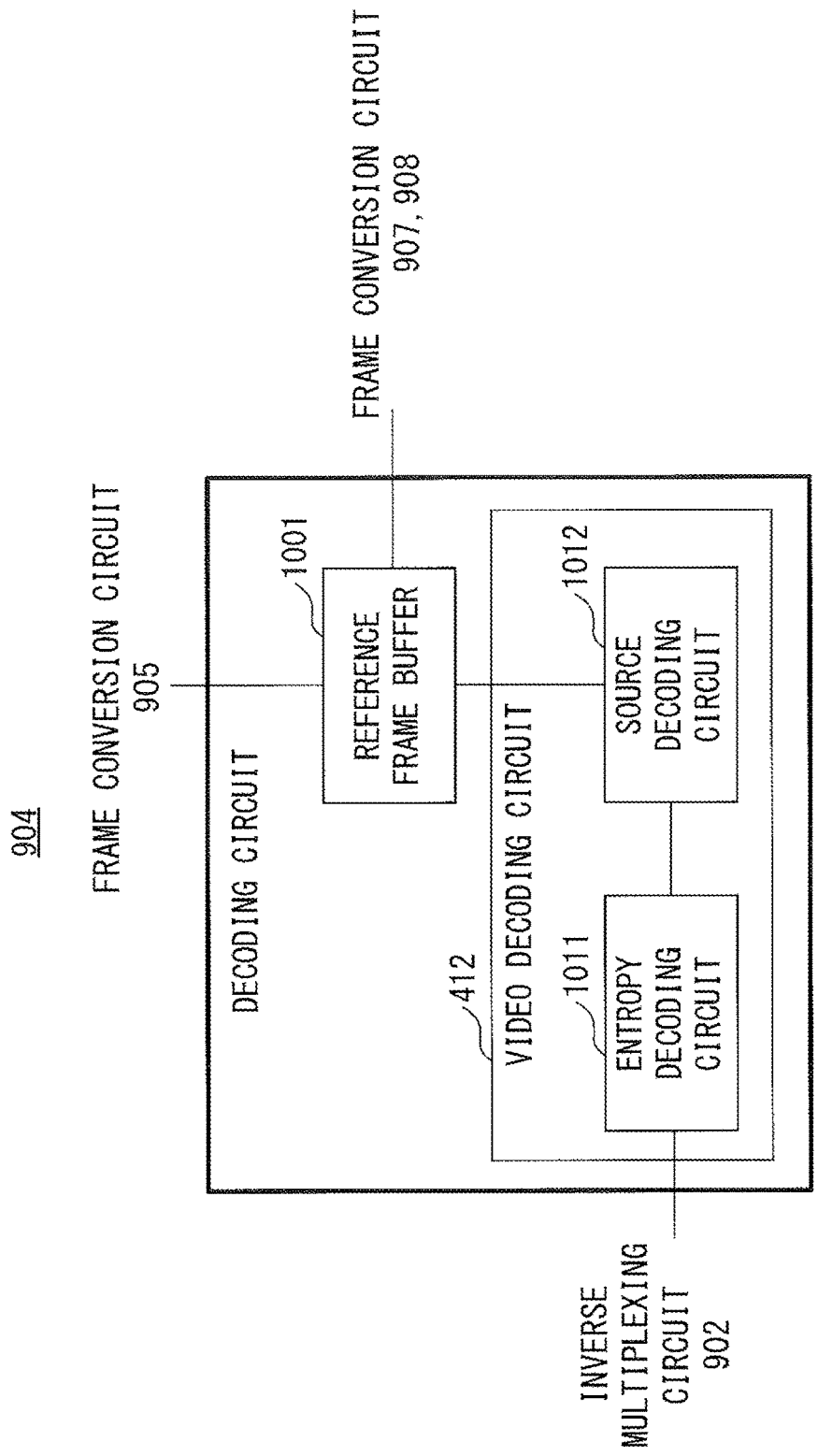
FIG. 10 illustrates a configuration of a decoding circuit.

FIG. 10 illustrates a configuration example of the decoding circuit 904 illustrated in FIG. 9. The decoding circuit 904 illustrated in FIG. 10 includes the video decoding circuit 412 and a reference frame buffer 1001. The reference frame buffer 1001 corresponds to the storage circuit 411. The video decoding circuit 412 includes an entropy decoding circuit 1011 and a source decoding circuit 1012.

The reference frame buffer 1001 stores, as a reference frame, a decoded frame output from the frame conversion circuit 905. This reference frame is output to the source decoding circuit 1012 when the inter prediction decoding is applied to the first video coded frame after the switching from the still-image coding to the video coding.

The entropy decoding circuit 1011 uses the entropy decoding to decode a video coded frame output from the inverse multiplexing circuit 902, and outputs the decoding result to the source decoding circuit 1012. The decoding result includes a prediction coding parameter etc.

The source decoding circuit 1012 applies the source decoding to the decoding result output from the entropy decoding circuit 1011 so as to generate a video decoded frame, and stores the generated video decoded frame as a reference frame in the reference frame buffer 1001. The source decoding corresponds to the inter prediction decoding or the intra prediction decoding, and includes the inverse quantization and the inverse frequency conversion, the inter prediction or the intra prediction, the addition of the conversion result of the inverse quantization and the inverse frequency conversion with a predicted pixel value, and the filtering that uses an intra-loop filter.

In the inter prediction decoding, the source decoding circuit 1012 inversely quantizes the decoding result output from the entropy decoding circuit 1011, conducts inverse frequency conversion on the result of the inverse quantization, and generates a prediction error. Then, the source decoding circuit 1012 generates a video decoded frame from the generated prediction error and the pixel value of the reference frame stored in the reference frame buffer 1001, and stores the video decoded frame in the reference frame buffer 1001.

The video decoded frame stored in the reference frame buffer 1001 is output to the frame conversion circuit 907 and the frame conversion circuit 908, and is used as a reference frame for a subsequent video coded frame.

Figure 11:
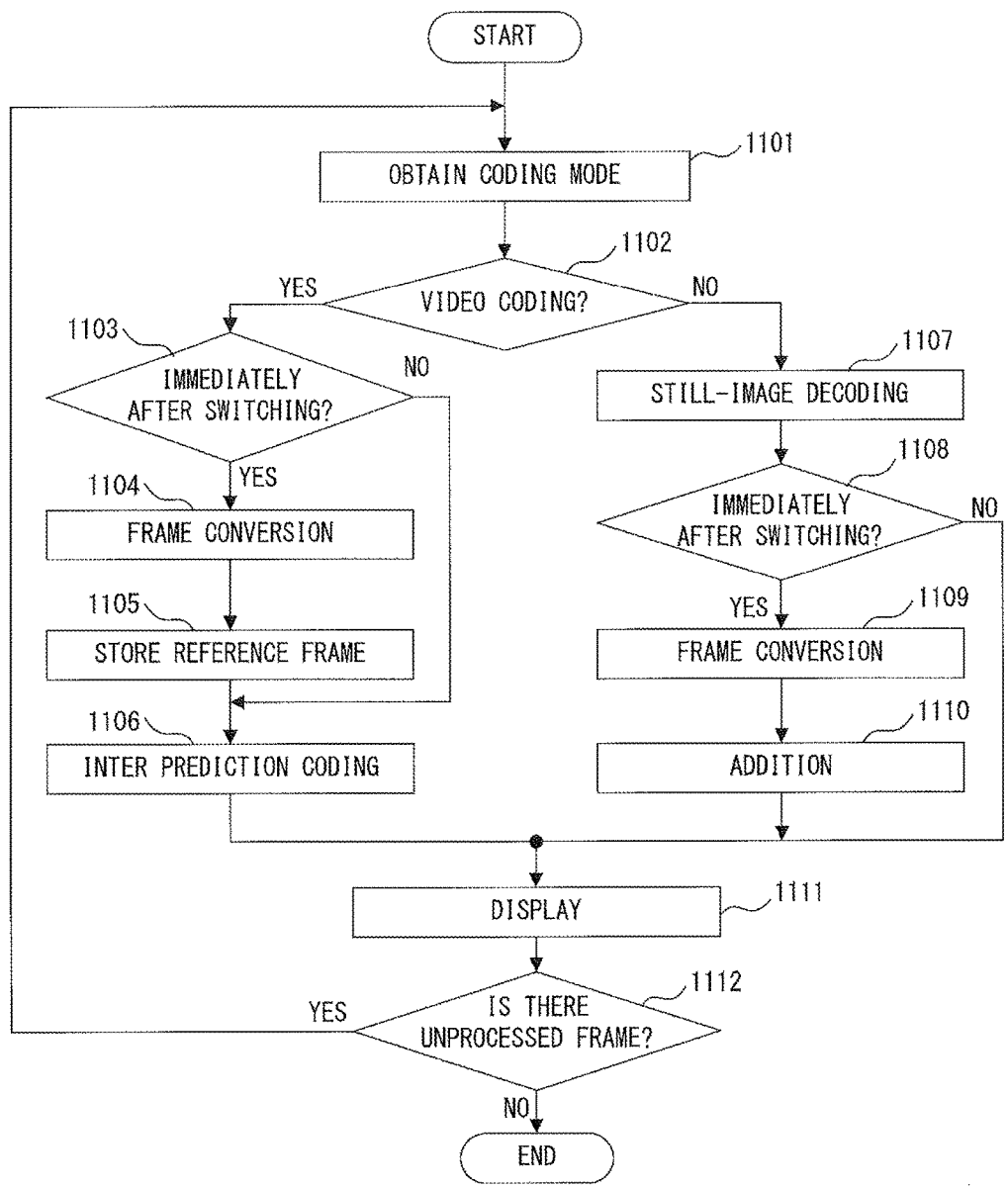
FIG. 11 is a flowchart illustrating a still-video mixed decoding process.

FIG. 11 is a flowchart explaining an example of the still-video mixed decoding process conducted by the video decoding device 401 illustrated in FIG. 9. First, the decoding control circuit 901 obtains information of the coding mode from the inverse multiplexing circuit 902 (step 1101), and checks whether the coding mode of the decoding target frame is the video coding or the still-image coding (step 1102).

When the coding mode of the decoding target frame is the video coding (Yes in step 1102), the frame conversion circuit 905 checks whether it is immediately after the switching of the coding mode to the video coding (step 1103). When the coding mode of the previous frame is the still-image coding, it is determined to be immediately after the switching, and when the coding mode of the previous frame is the video coding, it is determined to be not immediately after the switching.

When it is immediately after the switching to the video coding (Yes in step 1103), the frame conversion circuit 905 converts the color difference format of the previous still-image decoded frame into the color difference format of the video coding (step 1104). Then, the decoding circuit 904 stores the converted decoded frame in the reference frame list in the reference frame buffer 1001 (step 1105).

Next, the decoding circuit 904 uses the converted decoded frame as a reference frame and decodes a decoding target frame by the inter prediction decoding so as to generate a video decoded frame (step 1106). The decoding circuit 904 then adds the generated video coded frame to the reference frame list in the reference frame buffer 1001.

When it is not immediately after the switching to the video coding (No in step 1103), the decoding circuit 904 uses one of the reference frames in the reference frame list so as to decode a decoding target frame by the inter prediction decoding (step 1106).

Next, the frame conversion circuit 908 converts the color difference format of the video decoded frame into the color difference format of a video output from the video decoding device 401, while the frame buffer 910 outputs the converted decoded frame to the display device (step 1111).

Next, the decoding control circuit 901 checks whether or not a frame remains unprocessed (step 1112), and when a frame remains unprocessed (Yes in step 1112), the decoding control circuit 901 repeats the processes in and subsequent to step 1101 by treating the next frame as a decoding target frame.

When the coding mode of the decoding target frame is the still-image coding (No in step 1102), the still-image decoding circuit 903 decodes the decoding target frame by the still-image decoding so as to generate a decoding result (step 1107).

Next, the frame conversion circuit 907 checks whether or not it is immediately after the switching of the coding mode to the still-image coding (step 1108). When the coding mode of the previous frame is the video coding, it is determined to be immediately after the switching, and when the coding mode of the previous frame is the still-image coding, it is determined to be not immediately after the switching.

When it is immediately after the switching to the still-image coding (Yes in step 1108), the frame conversion circuit 907 converts the color difference format of the video decoded frame obtained by decoding the previous video coded frame into the color difference format of the still-image coding (step 1109). Then, the adder circuit 909 adds the converted decoded frame and the difference between the two frames represented by the result of decoding the decoding target frame so as to generate a decoded frame that is the addition result (step 1110).

When it is not immediately after the switching to the still-image coding (No in step 1108), the adder circuit 909 outputs to the frame conversion circuit 906 a still-image decoded frame that was obtained by decoding a decoding target frame.

Next, the frame conversion circuit 906 converts the color difference format of the decoded frame as the addition result or the still-image decoded frame into the color difference format of the video output from the video decoding device 401 (step 111). Then, the frame buffer 910 outputs the converted decoded frame to the display device.

Next, the decoding control circuit 901 conducts the processes in and subsequent to step 1112. When all frames have been decoded (No in step 1112), the decoding control circuit 901 terminates the process.

The configurations of the video coding device 301 illustrated in FIG. 3 and FIG. 5 and the coding circuit 508 illustrated in FIG. 6 are just exemplary, and the some of the constituents may be omitted or changed in accordance with the purposes or conditions of the video coding device 301.

For example, when a coding target frame, the still-image coding and the video coding employ the same color difference format, the frame conversion circuits 502 through 505 illustrated in FIG. 5 may be omitted. When the first coding target frame after the switching from the video coding to the still-image coding is coded by using the still-image coding such as JPEG etc., the difference calculation circuit 506 and the adder circuit 507 illustrated in FIG. 5 may be omitted. When the entropy coding is not conducted, the entropy coding circuit 604 illustrated in FIG. 6 may be omitted.

The configurations of the video decoding device 401 illustrated in FIG. 4 and FIG. 9 and the decoding circuit 904 illustrated in FIG. 10 are just exemplary, and some of the constituents may be omitted or changed in accordance with the purposes or the conditions of the video decoding device 401.

For example, when a video output from the video decoding device 401, the still-image coding and the video coding employ the same color difference format, the frame conversion circuits 905 through 908 illustrated in in FIG. 9 may be omitted. When the first coding target frame after the switching from the video coding to the still-image coding is coded by the still-image coding such as JPEG etc., the adder circuit 909 illustrated in FIG. 9 may be omitted. When the entropy coding is not conducted, the entropy decoding circuit 1011 illustrated in FIG. 10 may be omitted.

The flowcharts illustrated in FIG. 8 and FIG. 11 are just exemplary, and some processes in the flowcharts may be omitted or changed in accordance with the configurations or conditions of the video coding device 301 and the video decoding device 401. For example, when a coding target frame, the still-image coding and the video coding employ the same color difference format, the processes in step 805 and step 810 illustrated in FIG. 8 may be omitted. In such a case, the color difference format conversion processes in step 803 and step 808 may also be omitted.

When a video output from the video decoding device 401, the still-image coding and the video coding employ the same color difference format, the processes in step 1104 and step 1109 illustrated in FIG. 11 may be omitted. In such a case, the color difference format conversion process in step 1111 may also be omitted.

When the first coding target frame after the switching from the video coding to the still-image coding is coded by the still-image coding such as JPEG etc., the processes instep 809 through step 811, step 813 and step 814 illustrated in FIG. 8 may be omitted. In such a case, the processes in step 1108 through step 1110 illustrated in FIG. 11 may also be omitted.

In step 807 illustrated in FIG. 8, when it is immediately after the switching to the video coding, the coding circuit 508 may use, as a reference frame, the decoded frame of a frame that is N frames previous to a coding target frame (N is an integer equal to or greater than 2) instead of the previous frame, which is one image previous to the coding target frame. This leads to more selection candidates for a reference frame. In such a case, instep 805, the frame conversion circuit 504 converts the color difference format of the decoded frame of a frame that is N frames previous to the coding target frame into the color difference format by the video coding.

Also, in step 1104 illustrated in FIG. 11, the frame conversion circuit 905 converts the color difference format of a still-image decoded frame that is N frames previous to the decoding target frame into the color difference format of the video coding. Then, instep 1106, the decoding circuit 904 uses, as a reference frame, the converted decoded frame corresponding to the N-frames-previous still-image decoded frame.

The N-frames-previous frame used as a reference frame in step 807 illustrated in FIG. 8 may be a frame coded by using the video coding.

When it is immediately after the switching to the still-image coding in step 811 illustrated in FIG. 8, the difference calculation circuit 506 may calculate the difference by using the decoded frame of a frame that is N frames previous to a coding target frame instead of the previous frame, which is one image previous to the coding target frame. This leads to more selection candidates for a frame used for the calculation of differences. In such a case, in step 810, the frame conversion circuit 503 converts the color difference format of the decoded frame of a frame that is N frames previous to the coding target frame into the color difference format of the still-image coding.

Also, in step 1109 illustrated in FIG. 11, the frame conversion circuit 905 converts the color difference format of a video decoded frame obtained by decoding the video coded frame that is N frames previous to the decoding target frame into the color difference format of the still-image coding. In step 1110, the adder circuit 909 adds the converted decoded frame corresponding to the video decoded frame that is N frames previous and the difference between the two frames represented by the result of decoding the decoding target frame.

The N-frames-previous frame used for the calculation of the difference in step 811 illustrated in FIG. 8 may be a frame coded by the still-image coding.

Coding target images are not limited to a video including a screen content image, but may be a video including different types of images in which image deterioration are noticeable remarkably.

The video coding device 301 illustrated in FIG. 3 and FIG. 5 and the video decoding device 401 illustrated in FIG. 4 and FIG. 9 may be implemented by a hardware circuit, or may be implemented by using an information processing apparatus (computer) as illustrated in FIG. 12.

The information processing apparatus illustrated in FIG. 12 includes a Central Processing Unit (CPU) 1201, a memory 1202, an input device 1203, an output device 1204, an auxiliary storage device 1205, a medium driving device 1206 and a network connection device 1207. These constituents are connected to each other via a bus 1208.

The memory 1202 is semiconductor memory such as for example a Read Only Memory (ROM), a Random Access Memory (RAM), a flash memory, etc., and stores a program and data used for a still-video mixed coding process or a still-video mixed decoding process. The memory 1202 can be used as the storage circuit 311 illustrated in FIG. 3, the storage circuit 411 illustrated in FIG. 4, the input frame buffer 601 and the reference frame buffer 602 illustrated in FIG. 6, the frame buffer 910 illustrated in FIG. 9 or the reference frame buffer 1001 illustrated in FIG. 10.

The CPU 1201 (processor) executes a program by for example using the memory 1202 so as to operate as the video coding circuit 312 illustrated in FIG. 3 and FIG. 6 or the video decoding circuit 412 illustrated in FIG. 4 and FIG. 10.

The CPU 1201 also operates as the mode determination circuit 501, the frame conversion circuits 502 through 505, the difference calculation circuit 506, the adder circuit 507, the coding circuit 508, the still-image coding circuit 509, the still-image decoding circuit 510 and the multiplexing circuit 511 illustrated in FIG. 5. The CPU 1201 also operates as the source coding circuit 603 and the entropy coding circuit 604 illustrated in FIG. 6.

The CPU 1201 also operates as the decoding control circuit 901, the inverse multiplexing circuit 902, the still-image decoding circuit 903, the decoding circuit 904, the frame conversion circuits 905 through 908 and the adder circuit 909 illustrated in FIG. 9. The CPU 1201 also operates as the entropy decoding circuit 1011 and the source decoding circuit 1012 illustrated in FIG. 10.

The input device 1203 is for example a keyboard, a pointing device, etc., and is used for inputting instructions or information from the user or the operator. The output device 1204 is for example a display device, a printer, a speaker, etc., and is used for outputting inquiries or process results to the user or the operator. A process result may be a video output from the frame buffer 910 illustrated in FIG. 9.

The auxiliary storage device 1205 is for example a magnetic disk device, an optical disk device, a magneto-optical disk device, a tape device, etc. The auxiliary storage device 1205 may be a hard disk drive. The information processing apparatus can store a program and data in the auxiliary storage device 1205 beforehand so as to load them onto the memory 1202 and use them.

The medium driving device 1206 drives a portable recording medium 1209 so as to access information stored in it. The portable recording medium 1209 is a memory device, a flexible disk, an optical disk, a magneto-optical disk, etc. The portable recording medium 1209 may be a Compact Disk Read Only Memory (CD-ROM), a Digital Versatile Disk (DVD), a Universal Serial Bus (USB) memory, etc. The user or the operator can store a program and data in the portable recording medium 1209 so as to load them onto the memory 1202 and use them.

As described above, a computer-readable recording medium that stores a program and data used for the processes is a physical (non-transitory) recording medium such as the memory 1202, the auxiliary storage device 1205 or the portable recording medium 1209.

The network connection device 1207 is a communication interface that is connected to a communication network such as a Local Area Network (LAN), the Internet, etc. so as to perform the conversion of data used for communications. The network connection device 1207 transmit a coded video to the video decoding device 401 and can also receive a coded video from the video coding device 301. The information processing apparatus can receive a program and data from an external device via the network connection device 1207 so as to load them onto the memory 1202 and use them.

Note that it is not necessary for the information processing apparatus to include all the constituents illustrated in FIG. 12, and some of the constituents may be omitted in accordance with the purposes or conditions. For example, when an interface with the user or the operator is not necessary, the input device 1203 and the output device 1204 may be omitted. Also, when the information processing apparatus does not access the portable recording medium 1209, the medium driving device 1206 may be omitted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A video coding device comprising
a mode determination circuit configured to calculate a first difference between a coding target image included in a video and a previous image that is one image previous to the coding target image, and to compare the first difference and a threshold;
a frame buffer configured to store a first decoded image of a coded image that is coded before the coding target image;
a video coding circuit configured to code the coding target image by inter prediction coding that uses the first decoded image as a reference image when the first difference is greater than the threshold;
a difference calculation circuit configured to calculate a second difference between the coding target image and a second decoded image of a coded image for the previous image when the previous image has been coded by video coding;
a still-image coding circuit configured to code the second difference or the coding target image by still-image coding when the first difference is smaller than the threshold, wherein the still-image coding circuit codes the second difference when the previous image has been coded by the video coding and the coding target image when the previous image has been coded by the still-image coding; and an adder circuit configured to generate an addition result by adding a decoded difference of a coded second difference to the second decoded image and to output the addition result as a third decoded image to the frame buffer when the previous image has been coded by the video coding, and to output a decoded image of a coded image for the coding target image as the third decoded image to the frame buffer when the previous image has been coded by the still-image coding.

2. The video coding device according to claim 1, wherein the still-image coding circuit generates the coded image by coding the image that is one image previous to the coding target image or an image that is two or more images previous to the coding target image by the still-image coding.

3. The video coding device according to claim 1, wherein the mode determination circuit determines to apply the video coding to the coding target image when the first difference is greater than the threshold.

4. The video coding device according to claim 1, wherein the still-image coding converts the still image into a first format and codes the converted still image in the first format, and the video coding converts the moving image into a second format that has a smaller number of pixels than the first format and codes the converted moving image in the second format.

5. A non-transitory computer-readable recording medium having stored therein a video coding program causing a computer to execute a process comprising:

storing, in a frame buffer, a first decoded image of a coded image that is coded before a coding target image included in a video;

calculating a first difference between the coding target image and a previous image that is one image previous to the coding target image;

comparing the first difference and a threshold;

coding the coding target image by inter prediction coding that uses the first decoded image as a reference image when the first difference is greater than the threshold;

calculating a second difference between the coding target image and a second decoded image of a coded image for the previous image when the first difference is smaller than the threshold and the previous image has been coded by video coding;

coding the second difference or the coding target image by still-image coding when the first difference is smaller than the threshold, wherein the computer codes the second difference when the previous image has been coded by the video coding and the coding target image when the previous image has been coded by the still-image coding;

generating an addition result by adding a decoded difference of a coded second difference to the second decoded image and outputting the addition result as a third decoded image to the frame buffer when the previous image has been coded by the video coding; and outputting a decoded image of a coded image for the coding target image as the third decoded image to the frame buffer when the previous image has been coded by the still-image coding.

6. The non-transitory computer-readable recording medium according to claim 5, wherein
the process further comprises
generating the coded image by coding the image that is one image previous to the coding target image or an image that is two or more images previous to the coding target image by the still-image coding.

7. The non-transitory computer-readable recording medium according to claim 5, wherein
the process further comprises
determining to apply the video coding to the coding target image when the first difference is greater than the threshold.

8. The non-transitory computer-readable recording medium according to claim 5, wherein
the still-image coding converts the still image into a first format and codes the converted still image in the first format, and the video coding converts the moving image into a second format that has a smaller number of pixels than the first format and codes the converted moving image in the second format.

9. A video coding method comprising
storing, in a frame buffer, a first decoded image of a coded image that is coded before a coding target image included in a video;

calculating, by a mode determination circuit, a first difference between the coding target image and a previous image that is one image previous to the coding target image;

comparing the first difference and a threshold by the mode determination circuit;

coding, by a video coding circuit, the coding target image by inter prediction coding that uses the first decoded image as a reference image when the first difference is greater than the threshold;

calculating, by a difference calculation circuit, a second difference between the coding target image and a second decoded image of a coded image for the previous image when the first difference is smaller than the threshold and the previous image has been coded by video coding;

coding, by a still-image coding circuit, the second difference or the coding target image by still-image coding when the first difference is smaller than the threshold, wherein the still-image coding circuit codes the second difference when the previous image has been coded by the video coding and the coding target image when the previous image has been coded by the still-image coding;

generating, by an adder circuit, an addition result by adding a decoded difference of a coded second difference to the second decoded image and outputting the addition result as a third decoded image to the frame buffer when the previous image has been coded by the video coding; and outputting a decoded image of a coded image for the coding target image as the third decoded image to the frame buffer when the previous image has been coded by the still-image coding.

10. The video coding method according to claim 9, further comprising
generating, by the still-image coding circuit, the coded image by coding the image that is one image previous to the coding target image or an image that is two or more images previous to the coding target image by the still-image coding.

11. The video coding method according to claim 9, further comprising
   determining to apply the video coding to the coding target image when the first difference is greater than the threshold.

12. The video coding method according to claim 9, wherein
   the still-image coding converts the still image into a first format and codes the converted still image in the first format, and the video coding converts the moving image into a second format that has a smaller number of pixels than the first format and codes the converted moving image in the second format.

13. A video decoding device comprising:
   a frame buffer configured to store a first decoded image that is decoded before a decoding target image included in a coded video, wherein the coded video is generated by coding a coding target video, the decoding target image is generated by coding a coding target image included in the coding target video, still-image coding is applied to the coding target image when a first difference between the coding target image and a previous image that is one image previous to the coding target image is smaller than a threshold, and video coding is applied to the coding target image when the first difference is greater than the threshold;
   a video decoding circuit configured to decode the decoding target image by inter prediction decoding that uses the first decoded image as a reference image when the decoding target image has been generated by coding the coding target image by the video coding;
   a still-image decoding circuit configured to generate a second difference or a second decoded image when the decoding target image has been generated by coding the coding target image by the still-image coding, wherein the second difference is a difference between the coding target image and a third decoded image of a coded image for the previous image, the still-image decoding circuit generates the second difference by decoding the decoding target image by still-image decoding when the previous image has been coded by the video coding, and the still-image decoding circuit generates the second decoded image by decoding the decoding target image by still-image decoding when the previous image has been coded by the still-image coding; and
   an adder circuit configured to generate an addition result by adding the second difference to a fourth decoded image output from the frame buffer and to output the addition result as a fifth decoded image when the previous image has been coded by the video coding, and to output the second decoded image as the fifth decoded image when the previous image has been coded by the still-image coding.

14. The video decoding device according to claim 13, wherein
   the still-image coding converts the still image into a first format and codes the converted still image in the first format, and the video coding converts the moving image into a second format that has a smaller number of pixels than the first format and codes the converted moving image in the second format.

15. A non-transitory computer-readable recording medium having stored therein a video decoding program causing a computer to execute a process comprising:
   storing, in a frame buffer, a first decoded image that is decoded before a decoding target image included in a coded video, wherein the coded video is generated by coding a coding target video, the decoding target image is generated by coding a coding target image included in the coding target video, still-image coding is applied to the coding target image when a first difference between the coding target image and a previous image that is one image previous to the coding target image is smaller than a threshold, and video coding is applied to the coding target image when the first difference is greater than the threshold;
   decoding the decoding target image by inter prediction decoding that uses the first decoded image as a reference image when the decoding target image has been generated by coding the coding target image by the video coding;
   generating a second difference or a second decoded image when the decoding target image has been generated by coding the coding target image by the still-image coding, wherein the second difference is a difference between the coding target image and a third decoded image of a coded image for the previous image, the computer generates the second difference by decoding the decoding target image by still-image decoding when the previous image has been coded by the video coding, and the computer generates the second decoded image by decoding the decoding target image by still-image decoding when the previous image has been coded by the still-image coding;
   generating an addition result by adding the second difference to a fourth decoded image output from the frame buffer and outputting the addition result as a fifth decoded image when the previous image has been coded by the video coding; and
   outputting the second decoded image as the fifth decoded image when the previous image has been coded by the still-image coding.

16. The non-transitory computer-readable recording medium according to claim 15, wherein
   the still-image coding converts the still image into a first format and codes the converted still image in the first format, and the video coding converts the moving image into a second format that has a smaller number of pixels than the first format and codes the converted moving image in the second format.

17. A video decoding method comprising:
   storing, in a frame buffer, a first decoded image that is decoded before a decoding target image included in a coded video, wherein the coded video is generated by coding a coding target video, the decoding target image is generated by coding a coding target image included in the coding target video, still-image coding is applied to the coding target image when a first difference between the coding target image and a previous image that is one image previous to the coding target image is smaller than a threshold, and video coding is applied to the coding target image when the first difference is greater than the threshold;
   decoding, by a video decoding circuit, the decoding target image by inter prediction decoding that uses the first decoded image as a reference image, when the decoding target image has been generated by coding the coding target image by the video coding;
   generating, by a still-image decoding circuit, a second difference or a second decoded image when the decoding target image has been generated by coding the coding target image by the still-image coding, wherein the second difference is a difference between the coding target image and a third decoded image of a coded image for the previous image, the still-image decoding circuit generates the second difference by decoding the decoding target image by still-image decoding when the previous image has been coded by the video coding, and the still-image decoding circuit generates the second decoded image by decoding the decoding target image by still-image decoding when the previous image has been coded by the still-image coding;

generating, by an adder circuit, an addition result by adding the second difference to a fourth decoded image output from the frame buffer and outputting the addition result as a fifth decoded image when the previous image has been coded by the video coding; and outputting the second decoded image as the fifth decoded image when the previous image has been coded by the still-image coding.

18. The video decoding method according to claim 17, wherein the still-image coding converts the still image into a first format and codes the converted still image in the first format, and the video coding converts the moving image into a second format that has a smaller number of pixels than the first format and codes the converted moving image in the second format.

\* \* \* \* \*